United States Patent [19]

Webb

[11] Patent Number: 4,566,376

[45] Date of Patent: Jan. 28, 1986

[54] SYSTEM FOR PRODUCING CRISP FRUIT CHIPS

[76] Inventor: Wells A. Webb, 214½ E. Pine St., Lodi, Calif. 95240

[21] Appl. No.: 619,205

[22] Filed: Jun. 8, 1984

[51] Int. Cl.⁴ .......................... A23L 1/212; A23L 3/00
[52] U.S. Cl. ........................................ 99/468; 99/470; 99/472; 99/479; 99/483
[58] Field of Search ................. 99/467, 468, 469, 478, 99/470, 477, 472, 479, 483, 516, 534, 403, 410; 426/438, 445, 465; 34/15

[56] References Cited

U.S. PATENT DOCUMENTS 2,587,939 3/1952 Webb ..................................... 99/470
4,006,260 2/1977 Webb et al. .......................... 426/438
4,321,862 3/1982 Stevenson, III ...................... 99/468

Primary Examiner—Timothy F. Simone

Attorney, Agent, or Firm—Baker, Maxham, Callan & Jester

[57] ABSTRACT

A method and apparatus for delivering prepared wet fruit and vegetable particles into centripetal confinement under subatmospheric pressure, contacting the particles with heated edible oil until they have been puffed and dehydrated to a hygroscopic condition, hardening dried particles by cooling with cold oil, centrifugally removing excess oil and discharging the hygroscopic particles into packages to prevent access of moisture during storage and shipment.

A multiple unit system, comprising pressure vessels that are fitted with a multiplicity of relatively shallow trays is arranged to receive a procession of prepared wet fruit particles and dehydrate and puff the particles to a hygroscopic condition, then to deliver the puffed particles to a packaging machine, to be sealed in moisture barrier packages. The dehydrating vessels with auxillary systems are described.

11 Claims, 12 Drawing Figures

SYSTEM FOR PRODUCING CRISP FRUIT CHIPS

BACKGROUND

In our previous patent (U.S. Pat. No. 4,006,260) we presented a thorough review of the art in which the present invention lies. To produce crisp puffed hygroscopic fruit and vegetable particles in an attractive and appetizing form, thin slices such as of apple, pineapple, ripe banana, onion, pumpkin and whole seedless grapes and the like, are subjected to contact with heated edible oil in a vacuum environment until the particles are dehydrated and puffed; the puffed structure is hardened by cooling with cool oil, is moved from the drying region into a centrifuge, and is centrifugally deoiled while still subject to vacuum, is then restored to normal atmospheric pressure to await packaging and shipment.

In U.S. Pat. No. 2,587,939 I described the earliest version of this method of producing fruit chips. Here, the wet prepared particles were loaded into deep trays at a place outside of the vacuum chamber; the loaded trays were transferred to a vacuum chamber and inserted therein; and after processing was completed the vacuum chamber was opened up and the trays were removed to a location where they could be inverted and emptied.

Certain products, such as soft ripe banana slices had a tendency to stick to some of the tray surfaces and hand labor was required to clean the trays. For this and other reasons there was an incentive to reduce the number of trays by increasing the depth and hence the volume of each tray. On the other hand, tray depth could not be increased beyond a certain practical limit for the following reason. A tray depth of 16 centimeters can be used in the example. It is desired to evaporate moisture from a wet fruit particle that lies 16 centimeters or more beneath the surface of oil in the containing tray, and reach a moisture content in the particle of 2% when the surface of the oil is under a pressure of 4 torr. The particle will then be in a pressure environment of $16 \times 10/15.7 + 4 = 14.2$ torr, where 15.7 is the ratio of the density of mercury to the density of the oil. Moisture will evaporate from the particle so long as the vapor pressure of moisture in the particle exceeds 14.2 torr and the vapor pressure depends upon temperature; but the temperature cannot be raised above a certain point without undesired caramelization of the fruit sugars occurring. If, for example, the temperature of the particle has been raised by heated oil to the limiting temperature before caramelization occurs, and the particle has not been dried to the desired 2% moisture content, and further bubbling of water vapor out of the particle has stopped, then the only way to induce the resumption of drying without raising the temperature further, is to continue the treatment with further reduction of pressure. However in this example the vapor head pressure of 4 torr that exists on the surface of the oil covering the particle, is the limiting low pressure, and further reduction of this pressure would be economically unfeasible. Nevertheless there is a way by which the pressure on the particle can be further reduced, and this is by providing a shallower tray so that the particle is raised closer to the oil surface and hence is not subjected to so high a measure of static head of oil. Therefore shallow trays of say, 8 centimeters are required to dry this kind of fruit particle, which will double the number of trays required, and double the cleaning duty. The present invention provides for automatic mechanical emptying, cleaning and refilling of the trays and thereby makes possible the economical employment of shallow trays of optimum depth.

The above example demonstrates an exact method for determining optimum tray depth for each kind of fruit particle and drying condition. In sum, the method requires a simple preliminary test using a glass flask that contains heated oil and a representative wet particle of the fruit whose drying characteristics are being tested. The oil is heated to a temperature just below the caramelization temperature of the fruit, and the surface of the oil is kept evacuated to the pressure that has been previously determined to be the economical measure of vacuum. The oil depth beneath which the particle will stop giving off water vapor bubbles when the particle has 2% moisture content or some other desired end point of moisture content, is determined by moving the particle up or down through a range of positions beneath the oil surface. That position of the dehydrated particle at which its water bubbles stop evolving is a measure of the maximum optimum tray depth and establishes the vapor pressure for that particle.

The caramelization temperature of the fruit particle is readily determined by placing a dehydrated particle in cool oil and slowly raising the oil temperature until a slight darkening is observed; this is the caramelization temperature of that particular fruit.

Another difficulty encountered in previous attempts to produce these dehydrated puffed fruits lay in the requirement of an adequate quantity of oil chilled below about 35° C. for the cooling of the hot puffed particles to preserve their puffed structure by hardening them just prior to restoring normal atmospheric pressure. This difficulty of providing chilled oil arose from the circumstances under which heat exchangers must operate; for the heat-transfer coefficient in any heat exchanger that is designed to cool available oil that has been previously warmed by use in the process, is extremely low at low oil temperatures. Thus an extremely large surface area of heat exchanger must be used, often in conjunction with a refrigerated cooling fluid such as iced brine. In the present invention I eliminate the need for such expensive and elaborate oil chilling means.

In our U.S. Pat. No. 4,006,260 we introduced another new feature: the centrifuging of the cooled, dehydrated particles to remove excess oil from them before they are discharged from the vacuum environment. The centrifuge was arranged to operate inside of the vacuum processor, but it required the dehydrated particles to be moved out of the dehydrator and into the centrifuge, a difficult step that is eliminated in the present invention.

I have now invented improvements that have overcome the aforementioned difficulties and other difficulties, which will now be described.

SUMMARY AND OBJECTS OF THE INVENTION

It is a primary object of the present invention to provide a system and method of operation whereby crisp biological products may be mass produced without human intervention for loading and unloading the particles into and out of a batch-type vacuum apparatus.

A further object is to provide a system and method for manufacturing multiple batches of crisp fruit particles in coordination with the measured, continuous flow of prepared wet particles from the preparation department and delivering the finished crisp particles for packaging by a continuous packaging machine.

Another object is to contact wet fruit particles at subatmospheric pressure with an edible liquid heat transfer medium of low vapor pressure to dehydrate and puff the pores of the particles without caramelizing the fruit sugars, to harden the dried hygroscopic particles by cooling them with cold liquid and to remove the cooling liquid centrifugally under the vacuum condition, to return the fruit particles to normal atmosphere, to clean all surfaces of the dehydrating apparatus automatically, and then to reload the apparatus with a fresh charge of prepared wet particles for dehydration.

Another object is to prepare chilled liquid by contacting warm liquid with a batch of incoming wet fruit particles under vacuum conditions.

Another object is to provide a dehydrator of fruit particles with means whereby the drying cage can be rotated to centrifugally throw off excess dehydrating liquid from the finished dehydrated fruit particles.

Another object is to centripitally confine the new wet charge of fruit particles in the apparatus for dehydration, puffing, cooling and deoiling.

Another object is to centrifugally discharge the finished dehydrated particles from the apparatus, and scrape the compartment surfaces clean.

Other objects will be presented in the following description.

"Fruit" is used in this specification to include also "vegetable", and "particle" is used to designate a cut piece of fruit or vegetable of a size suitable for processing by the methods described, and may also designate whole grapes and any other whole fruit of small size that may be processed without cutting. The process described is also applicable to small pieces of meat such as shrimp, chicken and the like. "Hardening" the particles refers to solidification of pores while they are distended or puffed. The dehydrated substance of fruit particles, containing about 2% of moisture is composed of fruit sugars, flavor bodies, cellulose fibres, etc; this substance is soft and easily collapsed into a shapeless mass if restored to the atmosphere while newly dehydrated and hot; on the other hand, if it is chilled by contact with chilled oil, the mass becomes hard and can be restored to the normal atmosphere without collapse, and it retains much of its original appearance. Also, if the chilled fruit particles are centrifuged before they are restored to atmospheric pressure, clinging oil is thrown off their surfaces and does not penetrate into interior pores; this results in lower oil content of the manufactured fruit particles. In a previous patent (U.S. Pat. No. 4,006,260) I moved the soft particles out of drying zones into a centrifuge before cooling and centrifuging in a separate centrifugal apparatus. This complicated procedure tended to stick and collapse the soft fruit; I now convert the drying chamber to centrifugal action and expell the oil from contact with hardened fruit particles in the same chamber in which they were dehydrated. Then, after centrifugal action has expelled the oil, the atmospheric pressure is restored, the apparatus is opened for discharging and the newly dehydrated particles in the puffed condition are centrifugally thrown out and the apparatus is automatically cleaned and made ready for an new charge of wet particles.

By my invention, the fruit particles are quickly dehydrated in absence of oxygen. This greatly inhibits enzymatic browning, and no added artificial preservative is necessary. Fruit particles such as freshly cut apple, newly stemmed grapes, etc., soon show enzymatic browning; but if they are dehydrated immediately after cutting, which can be done by my invention, this browning does not occur to a material extent. Also, the dehydrated fruits are hygroscopic—their 2% moisture content is raised and their desirable crispness and crunchiness is quickly lost by contact with normal atmosphere. By my invention, means are provided whereby these desirable qualities are preserved by prompt packaging in a continuously operating packaging machine, that puts the fresh particles into moisture-proof containers immediately after their discharge from the dehydrator.

Figures 1, 2:
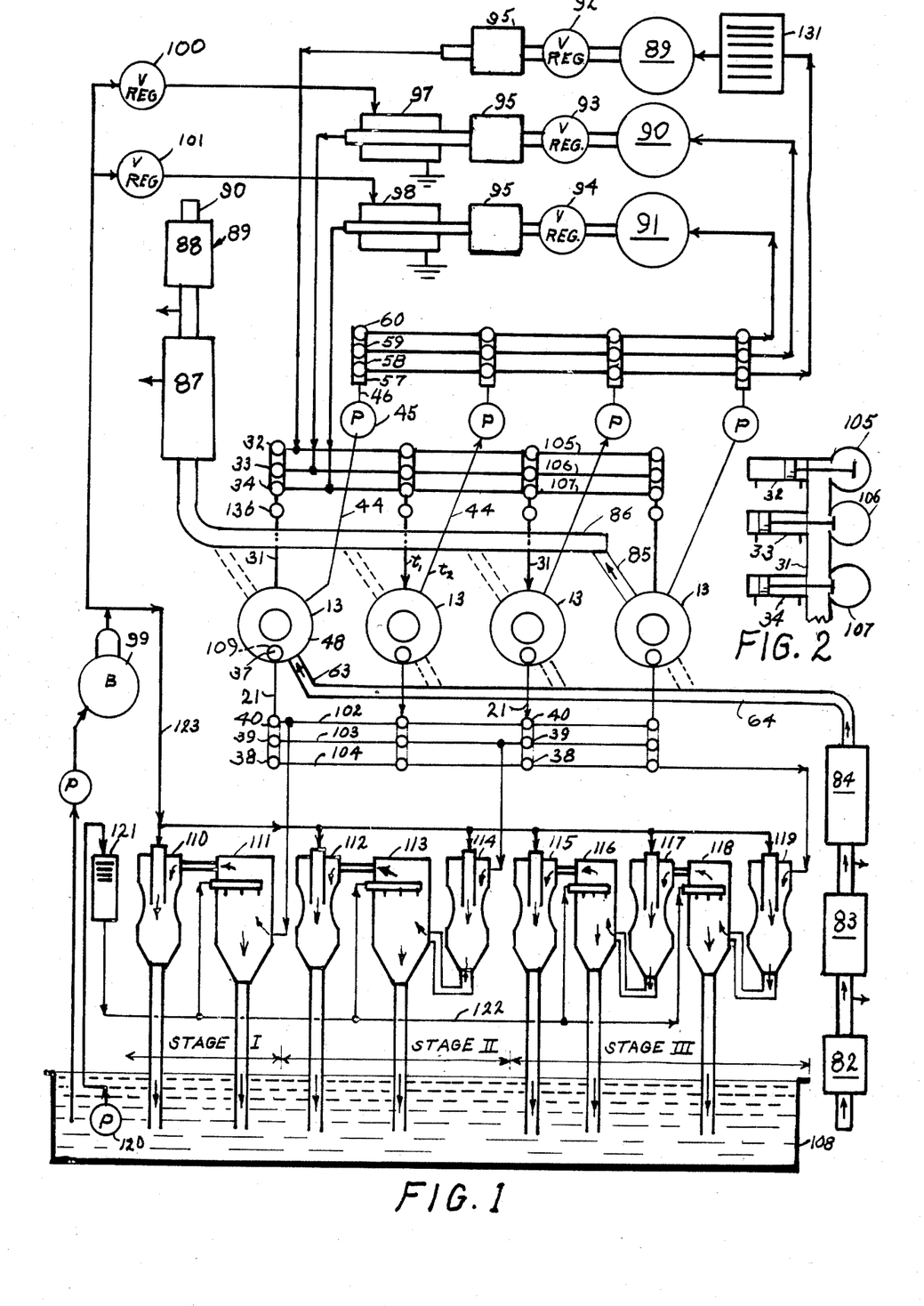
FIG. 1 is a schematic diagram in which the upper part of the diagram shows the symbols that represent the calandrias, tanks and conveyors in plan view; and the lower part of the diagram represents the evactors, condensors and water reservoir in elevation; and the connecting pipes and valves are drawn with simple line connections; and the whole drawing represents a multiple unit dehydrating plant, according to the present invention.
FIG. 2 shows schematically the manner of construction of the valve headers.

The normal operation of a dehydrating establishment requires the employment of a crew for preparation of fresh wet fruit particles; these people must be kept busy at least 8 continuous hours per day. I can keep up with the flow of fresh particles from the preparation department if I employ several calandrias: FIG. 1 shows the use of four of these dehydrators in stepped sequence. The employment of a plurality of dehydrators operating in stepped sequence as depicted in Table II has the further advantage that substantial energy savings are possible: separate vacuum systems are employed for high, medium and low vacuum pressures, and these equipments are continuously utilized at their maximum efficiency by switching stepwise with valves among calandrias operating simmultaneously in separate phases. cleaning may be followed by wet washing before the apparatus is reloaded with a new wet batch of fruit particles. "Calandria" refers to the batch processing vessel used in the present invention.

BRIEF DESCRIPTION OF THE DRAWINGS

The above objects and advantages of the present invention will become apparent from the following description when read in conjunction with the accompanying drawings wherein:

FIG. 5 shows the upper part of the calandria assembly with the lid raised to accomodate the discharge action when it is applied to the top space I; here the core 47 has been raised to occupy Station a.

The Calandria Assembly

DETAILED DESCRIPTION OF A PREFERRED EMBODIMENT

Figures 7, 8, 9:
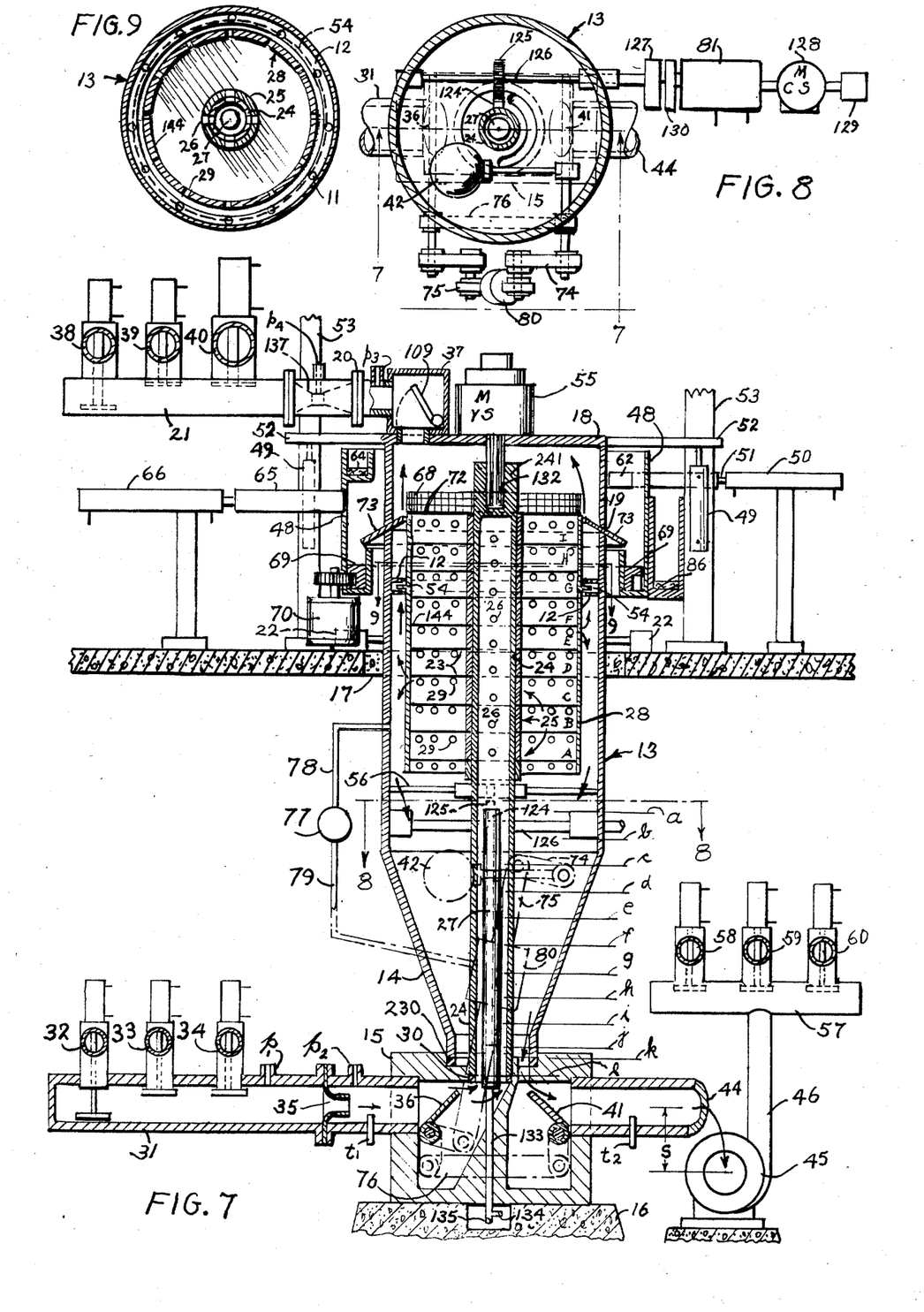
FIG. 7 is a sectional view of the calandria with appertinent connections of inlet and outlet conveyors, oil conduits, vacuum pipes and manifold headers and valves and control means.
FIG. 8 is a section through 8—8 of FIG. 7 showing control means.
FIG. 9 is a section through 9—9 of FIG. 7, showing vent holes 11 in annular rings 12—12.
Figures 10, 11, 12:
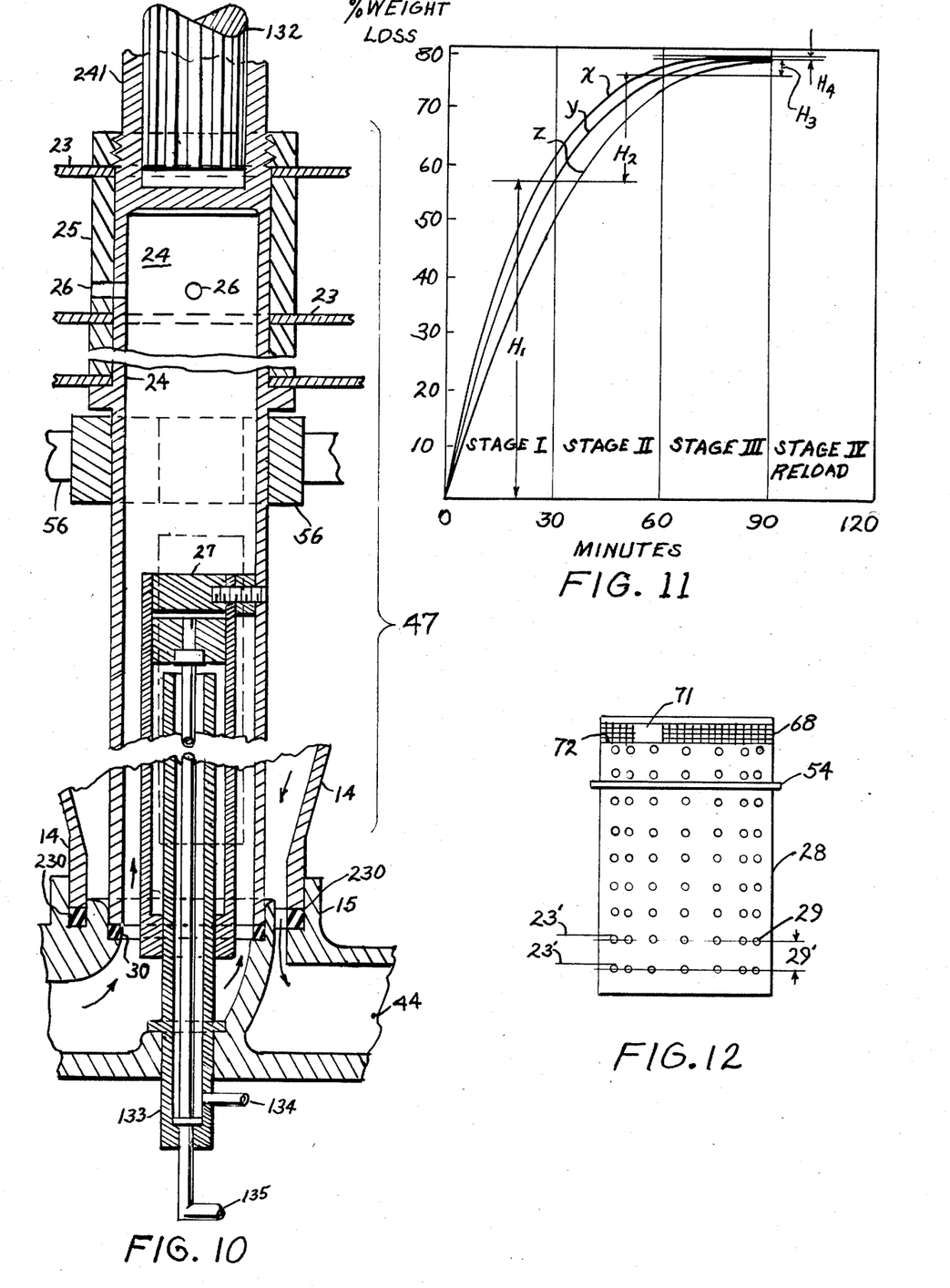
FIG. 10 is a section through the vertical shaft or axis of the batch-type vacuum vessel that I employ; the figure shows my preferred system for admitting heat transfer liquid to the processing trays and the system for raising and lowering the core during unloading and reloading.
FIG. 11 is a graph of the dehydration process carried through its several stages with moisture evaporated as ordinate and duration as abscissa.
FIG. 12 is a view of the screen assembly unit that comprises the loading screen 68 and the dehydrating screen-set 28; this assembly is cylindrical, and is capable of enclosing the core unit 47, to create a stack of spaces or compartments, in which particle processing occurs.

With reference to FIGS. 7 and 10, the calandria comprises a vertical pressure vessel 13 with a conical bottom part 14 that stands in a supporting casting 15 that rests on foundation 16. Normally the calandria is of a size to have a significant production capacity, and hence its upper part projects through a large hole 17 in the second story of the building that houses the apparatus. A lid 18 closes the top of the calandria, making a horizontal vacuum tight seal 19 with the calandria body, and a vertical seal 20 with the water vapor header line 21, both of these seals being easily dis-connected and re-connected. The cone 14 terminates at rubber seals 30 and 230 that permit vibration of the upper part of the calandria without leaking. Vibrations are snubbed by shock absorbers 22—22 that press against the vessel to absorb energy and yield and restore displacement. Inside the calandria is a core member 47 comprising circular trays 23 mounted on a tubular shaft 24 that extends from bottom to top of the calandria. The trays are held firmly in place on shaft 24 by spacer collars 25. Collars 25 are drilled through with holes 26 to communicate with similar holes on shaft 24 so that oil can flow from inside hollow shaft 24 and enter the spaces that exist between adjacent trays 23, as shown by dotted lines in FIG. 6 and the small circles 26—26 on FIG. 7. A hydraulic ram is mounted inside shaft 24. This ram 27 serves fo lift shaft 24 that moves the whole core assembly vertically through the several stations of movement, a,b,c,c,e,f,g,h,i,j,k, and l. This motion is stepwise, with a stop at each station. The stations are marked on FIG. 7 by horizontal lines; a station location is noted by the crossing of a horizontal line by the bottom end of shaft 24 when it is in vertical movement. Construction details of shaft 24 are depicted in FIG. 1 Trays 23—23 are enclosed in screen assembly shown in FIG. 12. This screen assembly is composed of a cylindrical top screen 68 rotatably mounted on top of cylindrical screen-set 28 which is pierced with horizontal rows of small holes 29—29. The vertical spacing 29' of the horizontal rows 29—29 is accurately set to coincide with the vertical spacing of trays 23—23. The stations a to j inclusive are set so that the positions 23'—23' occupied by trays 23—23 define spaces A,B,C,D,E,F,G,H and I respectively as shown in FIG. 7; and oil entering a space A to I can only exit at the upper level of holes 29 together with water vapor and thus fruit particles in the spaces A to I are submerged in oil whose upper level is at the row of holes 29.

Screen 28 is confined in its vertical movement by its attachment to ring 54 that engages rings 12—12 of FIG. 7; thus when trays 23—23 move vertically, they slide inside of screens 28-68 which do not move vertically. Screen 68 is of a mesh to retain fruit particles and pass oil; it is mounted to be capable of being rotated into an alignment on bearing 72. A port 71 is adapted to pass filler conveyor 65 when the latter is thrust in by ram 66; and port 71 will pass the discharge scoop and cleaning tool 62 when it is thrust in by ram 50. For entrance of filler 65 and tool 62 respectively, the screen 68 is rotated so that port 71 is suitably aligned for either action.

The processing trays 23 are made of flat sheet metal. These trays are capable of being slid up and down by action of ram 27 which raises and lowers shaft 24 during loading and unloading of particles. When the shaft 24 is suitably positioned in its vertical alignment inside screen-set 28, spaces A to I are formed for processing action. Screen-set 28 is in frictional contact with the tray peripheries 144 and will rotate when the trays rotate; the fit between tray peripheries 144 and the inside of screen-set 28 is close enough so that the amount of oil that leaks between the two members is immaterial. Acting together, the trays 23 and the blank wall portion of screen-set 28 enclose and restrain the material that is being treated in spaces A to I respectively. The holes 29 are sufficiently large and numerous to vent simultaneously the water vapor and the oil that overflow spaces A to I, but these holes are small enough to retain fruit particles that are being treated.

An oil conducting header 31 brings oil through a selected valve 32, 33 or 34 when the valve is open, as in FIG. 7, and thence through measuring flow nozzle 35. The flow of this intake oil is metered by an instrument attached to pressure taps $p_1$ and $p_2$ and the flow rate is regulated by a float actuated valve 36. The metered oil flows into hollow shaft 24 at the level l; this is the level of intake seal 30. The oil flows out of hollow shaft 24 through holes 26 that lead to spaces A to I. After treating the particles in spaces A to I, oil and water vapor together exit the spaces via holes 29—29 in screen-set 28 and the water vapor separates from entrained oil, rises to pass through valve 37, enters one of the evactor systems through a selected opening of one of the vacuum valves 38, 39, or 40. Oil that passes through holes 29—29 of screen-set 28 falls into the reservoir of cone 14. If the oil level in cone 14 is low, for example at level f, or lower, oil exit valve 41 is closed and the oil accumulates in cone 14 until float 42 rises enough distance to close intake valve 36 and open outlet valve 41. Float 42 stabilizes its position at approximately level d; at level d, inlet valve 36 is partially open, and outlet valve 41 is partly closed; flow of oil into the processor is then equal to flow out of it, and oil level stabilizes about at level f. Suction pump 45 takes oil out of outlet 44; since the oil is flowing out of a vacuum environment, the suction head on the inlet of the pump must be generated by a gravity head in which the oil falls from the outlet 44 into pump inlet 45, a distance S equal to or exceeding the minimum suction head characteristic of the pump. The pump delivers oil to outlet 46 at a pressure slightly above atmospheric pressure, or sufficient to ensure adequate flow rate to header 57 and valves 58, 59 and 60 that in their turn, deliver the oil to a selected oil storage tank 89, 90 or 91 illustrated in FIG. 1.

Figures 4, 6:
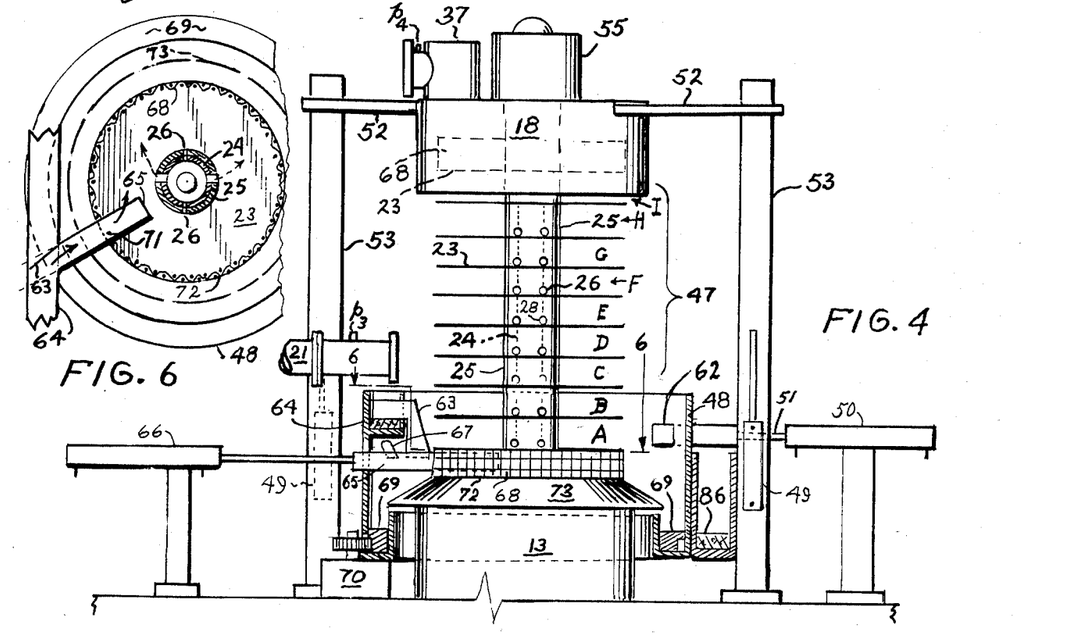
FIG. 4 is a fragmentary elevation view of one calandria that projects through the second floor of the building that houses it, the core being raised to the maximum height for discharge of the finished particles and commencement of reloading. The circular baffle 48 is sectioned to reveal the interior parts that serve to feed wet particles and discharge dried particles.
FIG. 6 is a sectional view taken at 6—6 of FIG. 4, that shows the plan of one tray Space or compartment in the phase of being loaded.
Figure 5:
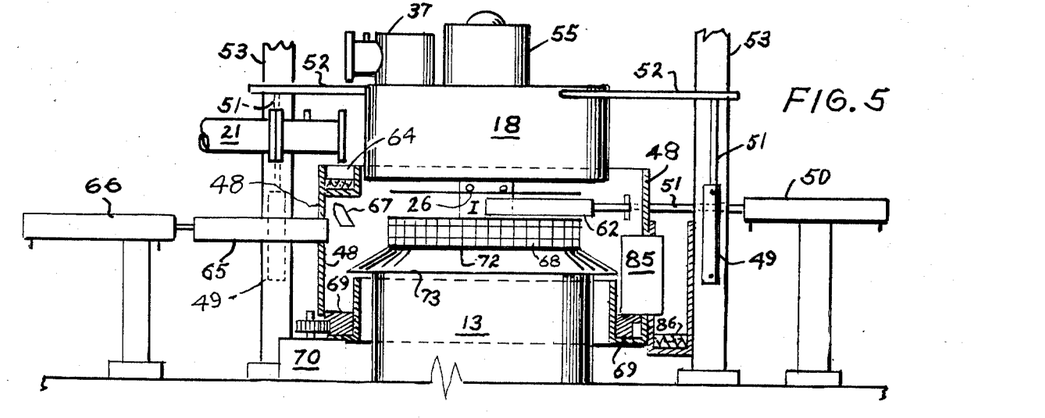

The core assembly 47 is fitted with means for lifting it above the screen assembly 28–68: with reference to FIG. 5, two hydraulic rams 49—49 actuate plungers 51—51 that push up on lid ears 52—52 and lift lid 18 to clear Space I for product discharge, Guide posts 53—53 contact ears 52—52, assuring vertical movement of the core. The lift force, after plungers 51 have been extended to their limit, is continued by hydraulic ram 27, shown in FIG. 7. Hydraulic ram 27 is capable of lifting the core 47 to the extreme elevation shown in FIG. 4. During upward and downward movement of core 47 the assembly comprising screen-set 28 and screen 68 remains unchanged in its position, being locked against vertical movement by rings 12—12.

A hydraulic cylinder 50 reciprocates rod 51 that carries cleaning tool 62 into and out of Spaces A–I respectively to discharge finished product from each space in turn, as ram 27 raises the core assembly step by step and the core is slowly rotated by motor 55. This is the cleaning action that prepares the Spaces for reloading. Ram 27 lifts the core assembly step by step to the extreme vertical position shown in FIG. 4 wherein Spaces A to I have been centrifugally emptied of finished product through port 71 and then cleaned of residue. Next stage is lowering the core and filling the Spaces with fresh wet particles; this occurs step by step. A step is defined by bringing the core Space into alignment for cleaning by tool 62, or for filling with wet particles by filler 65. To commence filling the empty cleaned core Spaces, the core assembly 47 as illustrated in FIG. 4, is lowered one step to Station a of FIG. 7. This action brings Space A into alignment with wet particle filler 65, which is thereupon inserted into Space A.

Actuation of hydraulic ram cylinder 66, pushes the filler into Space A. A deflector baffle 63 has been constructed to be lowered into wet particle conveyor 64 and be adjusted to turn the moving wet particles out of conveyor 64 and drop them onto wet particle feeder 65. A nozzle 67 for flushing oil is activated to direct oil against the falling particles and wash them into Space A. Variable speed motor 55 turns the core assembly clockwise at about 20 RPM; this rotary action carries the wet particles around on tray 23 until they are stopped by impingement on feeder 65, as shown in FIG. 6. Excess flushing oil passes through screen 68 to fall into cone 14. Continuation of this action results in the filling of Space A with wet particles; then wet particle feeder 65 is withdrawn, ram 27 lowers core 47 one space to Station b, whereupon Space B is then in alignment to be filled. Ram 66 is again activated to push feeder 65 into space B, which is then filled with wet particles. During the interval when feeder 65 is being withdrawn and re-inserted into a new space, the wet particle conveyor may be momentarily stopped, to avoid spilling wet particles, and a valve supplying oil to nozzle 67 may be turned off to prevent oil from dripping onto annular conveyor 69. To admit feeder 65, an opening 71 is provided in screen 68. Screen 68 is mounted on an annular bearing 72 that permits screen 28 to turn beneath it and to support screen 68. This process is repeated step by step until all of the spaces are filled with wet particles. Then lid 18 is lowered to make a seal with conical deflector 73, and then vacuum may be drawn and dehydration will proceed as will be described.

The maintenance of oil inside cone 14 at about level d is a critical factor necessary for the smooth operation of the process. To ensure reliable maintenance of oil at level d, the motions of valves 36 and 41 must be under the control of float 42; when the oil level falls, float 42 will fall, and links 74, 75 and 76 will operate to close valve 41 and open valve 36. When the oil level rises, float 42 will rise and links 74, 75 and 76 will operate to open valve 41 and close valve 36. Great reliability in this action can be achieved by use of a force amplifier that gets its energy from vacuum. Thus we have arranged vacuum diaphragm 77, connected with vacuum through line 78, to actuate a force amplifier 80 through connector line 79, an action well known in the art.

The sequencing of operations can be done manually, employing one or more operators; however we prefer to automate this sequencing, and this is done by means of well known techniques. For example, the system employed in our former U.S. Pat. No. 4,006,260 may be employed. A hydraulic sequencer 81 is shown in FIG. 8 that delivers oil in timed sequence to the various hydraulic rams and valves 27, 66, 50, etc., to make the essential components operate in accord with a schedule such as that of Table 1.

Support and Auxiliary Systems

Several auxiliary and support systems are combined in a unique way to produce the novel effects of the present invention. A multiplicity of calandrias 13 are assembled and connected with the auxiliaries and supports in the manner of FIG. 1. The raw produce articles are cleansed in washer 82, are peeled and cut into particles or slices as required by peeler-slicer 83, then the particles are conveyed into scales 84 and are metered out in predetermined small batches to conveyor belt 64. In this way, each Space A to I of a calandria is filled with a measured quantity of prepared wet particles. Measurement by some system, such as by cutting off a particle stream in a timely manner by actuation of deflector baffle 63 of FIG. 4 assures of uniform drying effect and a consistently high quality finished product. The timing of the calandria operation is such as to assure the continuation of utilization of particles flowing on conveyor 64. When one calandria has been filled, it is closed off, and dehydration is started in that calandria, and the wet particle flow on conveyor 64 is diverted to another calandria that has just completed a drying cycle and whose trays are empty and cleaned. The screens 28 and 68 of the calandria are cleaned by the rubbing action of the peripheries of trays 23 when the core 47 is lifted up and let down by action of hydraulic cylinder 27; and the tray surfaces 23 are cleaned by action of tool 62 rubbing on the surfaces when it is pushed into a Space A to I and the core with its trays is rotating in the manner already described. If desired, the core may be rotated at a high enough rate, say 100 to 200 RPM to throw out the bulk of the dry charge into product discharge baffle 48 and annular conveyor 69 before entering cleaning tool 62 into the discharging space; then, when the surfaces are almost empty, the tool may be entered to scrape the surfaces clean. The flat surface of a rotating annular conveyor 69 that is rotated by motor 70 moves the dry particles that have been discharged from a space A to I, to impinge on deflector 85 and then to fall onto conveyor belt 86. Conveyor belt 86 brings the dry particles to inspection table 87 where defective particles are selected and discarded. Thence the inspected stream of dry particles enter a closing machine 88 that hermetically seal them in containers supplied at 89. The sealed product in containers is discharged by belt 90 ready for shipment, as in FIG. 1.

The treating oil, which may be soy, cottonseed, safflower, coconut or other edible oil of low vapor pressure or a mixture of these, is contained in oil storage tanks at temperatures convenient for use. Thus tank 89 contains chilled oil at about 25° C. to 35° C.; tank 90 contains oil at about 50° C. to 70° C. and tank 91 contains oil at about 70° C. to 110° C. Oil from tank 90 is heated by steam that comes from boiler 99, which may be any other economical heat source such as solar or geological that is regulated by valve 100 and acts on the oil through heat exchanger 97, as the oil leaves the tank through valve 93 and filter 95. A similar heat source, regulated by valve 101, heats oil from tank 91 through heat exchanger 98. Oil temperatures intermediate between those temperatures listed above may be achieved in the outflow of oil that enters the calandria by blending oils from two or more of the sources 89, 90, or 91, by regulation of valves, such as valves 32, 33, or 34, and by other blending means obvious to one skilled in the art. Oil is discharged from the calandria through outlet 44 into pump 45 and thence by way of 58, 59 or 60 into one of the tanks 89, 90, or 91. FIG. 2 shows details of header 31 and valves 32, 33, and 34 with their hydraulic actuators; headers 21 and 57 are similarly constructed and operated.

Vacuum means erected over sump or hot well 108 shown in FIG. 1 remove water vapor from the calandrias through valve 37 when flapper 109 is open, and one of the valves 38, 39 or 40 in header 21 is open. Three evactor systems are shown. Evactor Stage I comprises a barometric condensor 111 and one or two steam ejectors 110; if two ejectors 110 are used, they should be connected in series. Evactor Stage II comprises a steam ejector 114 that discharges into barometric condensor 113, and the latter discharges uncondensed vapor into steam ejector 112. Evactor Stage III comprise booster 119 that discharges into barometric condensor 118, and the latter discharges uncondensed vapors into ejector 117, which discharges uncondensed vapors into intercondensor 116, from which uncondensed vapors are absorbed by steam ejector 115 and discharged into the waters of hot well 108. The art of vacuum generation is well developed, and other systems may be used, for example a refrigerated surface condensor evacuated by a mechanical vacuum pump, with-out departing from the essence of the present invention, as defined in the claims.

A boiler 99 supplies steam to power the aforementioned steam ejectors. Water of hot-well 108 is circulated by pump 120 through water cooler 121, and the cooled water is sent to supply the barometric condensors, by manifold 122. Steam under pressure from the boiler passes through steam line 123 to the ejectors.

CONTROL OF THE DEHYDRATION

When the apparatus is constructed and assembled as above described it may be utilized to carry out vacuum operations involving heating, dehydration of particles, cooling, and centrifugal removal of oil followed by discharge of the treated load, cleaning surfaces and re-loading with measured quantities of wet particles. And these operations of one calandria may be coordinated with operations of associated calandrias and with supply and packaging facilities so that an integrated whole production system of large capacity is created. The operations in a single calandria may be programmed on a computer by suitable software in accord with a predetermined schedule, of which that set forth in Table 1 is an example. When more than one calandria assembly is incorporated in a multiple system; for example, when four calandrias are operated together as in the diagram of FIG. 1, important advantages and economies of size are realized as result of operating an integrated multiple system. An operations schedule for an integrated multiple system is presented in the example of Table 2.

As an aid to the operator who monitors the calandria operations, we provide an indicating device as shown in FIGS. 7 and 8, wherein a toothed rack 124 is attached to shaft 24 and engages a reduction unit such as pinion 125 on shaft 126 that turns indicator drum 127 one forward revolution when core 47 is moved upward from its lowest position in Station 1 to its highest position in Station a; and drum 127 turns one reverse revolution when core 47 is lowered from Station a to Station 1, when following a schedule such as that of Table 1. Controlling devices such as the hydraulic sequencer 81 and a programmed computer 129 are coordinated and timed by constant speed motor 128 to operate all of the many control valves and electric controls that induce fluid flow, core movement, etc of Table 1. Pressure taps $p_1$ and $p_2$ give oil pressure readings at the inlet and outlet of nozzle 35 from which the flow rate w (in pounds per second) at any moment can be calculated by the computer 129 when it is programmed to deal with the formula:

$$W_o = 60.2A \sqrt{p_1 - p_2} \text{ pounds of oil per second} \qquad \text{Formula 139}$$

This formula is a simplified version of that cited in "Perry's Chemical Engineers' Handbook, 4th Edition (1963) page 5-8; McGraw Hill Book Co. Notations are defined as follows:

A=Crossectional area of nozzle, sq.ft.
c=Specific heat of oil (0.512 BTU/lb.°F).
$H_y$=Weight of water vapor evaporated, lb./sec.
$H_1$=Water evaporated in Stage I, lbs./sec.
$H_2$=Water evaporated in Stage II, lbs./sec.
$H_3$=Water evaporated in Stage III, lbs./sec.
$H_4$=Water remaining unevaporated in finished product, lbs.
h=latent heat of evaporation of water (1000 BTU/lb.)
$p_1$=pressure at tap upstream from nozzle 35, lb/sq.ft.
$p_2$=pressure at tap downstream from nozzle 35, lb/sq.ft.
$p_3$=pressure at tap upstream from nozzle 137, lb/sq.ft.
$p_4$=pressure at tap downstream from nozzle 137, lb/sq.ft.
L=Weight of wet load, lbs.
S=Weight of solid material in wet load, lbs.
$H_o$=L−S=Weight of water in wet load, lbs.
$t_1$=Temperature of calandria intake oil, °F.
$t_2$=Temperature of calandria outlet oil, °F.
Q=Heat demand, BTU/sec.
$W_o$=Intake oil flow rate, lbs./sec.

$W_o$ cannot be held constant from second to second, since oil flow must be regulated by float 42 to maintain level of oil at level d. But an average flow rate minute by minute will be approximately constant. This variation must be taken into account, by using Formula 139 in calculating evaporation rate; which also depends upon the difference in temperature of the outlet oil and intake oil ($t_1-t_2$).

Formula 140: $H_v = W_o c(t_1-t_2) \div h$ gives pounds of water evaporated per second. This can be condensed to:

$$H_v = 0.0308 A \sqrt{(p_1 - p_2)} \; (t_1 - t_2) \frac{\text{lbs}}{\text{sec}}. \quad \text{Formula 141}$$

By use of this formula, the progress of evaporation of moisture from a load in the calandria can be followed relatively closely and evaporation rate can be made to follow one of the cures X, Y or Z of FIG. 11, or some other curve selected to satisfy conditions of the load and the relation with other calandrias in the system. For example, if the particular conditions in the calandria being regulated are producing a lower evaporation rate than desired, such, for example as that represented by curve Z, and it is desired to have the rate follow that represented by curve Y, the correction in rate can be made by increasing temperature $t_1$, thereby increasing the rate of heat input. However, on the other hand, if the process is going too fast and following a curve such as X, the correction can be made by decreasing $t_1$, thereby decreasing the rate of heat input. These corrections can be made by a programmed computer such as 129, FIG. 8 that causes valves to be manipulated such as steam inlet valves 100 and 101, of FIG. 1. in a manner well known in the art.

A second method for deriving dehydration rate is possible, that serves as a check upon that just described. Water vapor flow rate $H_v$ out of vacuum line 21 can be calculated from pressure readings upstream and down stream from nozzle 137 of FIG. 7, as follows:

$$H_v = 1.44 A \sqrt{(p_3 - p_4)} \; \text{lb/sec.} \quad \text{Formula 142}$$

By utilizing a program based on Formulas 141 and 142, the supervising operator and the programmed computer are able to exercise exact control and regulation of the steps of dehydration, puffing, cooling, centrifugal deoiling, and discharge in the sequence of operations applied to loads of fruit particles undergoing treatment in the calandria. The details of unloading a dry batch and reloading with a wet batch of particles are in Table 1.

TABLE 1
SCHEDULE
UNLOADING AND RELOADING CALANDRIA

Schedule starting condition: Core 47 is in position shown in FIG. 7; the Spaces A to I are loaded with particles that were dehydrated in the previous cycle. These spaces must now be emptied and cleaned. As the core is raised, the lower tip of Shaft 24 stops at Stations i, h, g, f, e, d, c, b, and a. The spaces are emptied and cleaned at each stop, as described in detail below:

| Elapsed minutes | Station (Shaft 24 position) | Action: Normal atmospheric pressure returned. Oil flow stopped. Ram 27 raises core to Station i. Rams 49 raise lid 18. |
|---|---|---|
| 0 to 0.1 | 1 i | Core position as in FIG. 5. Motor 55 rotates core; contents of Space I centrifugally expelled. Ram 50 enters tool 62 and cleans Space I. 24 |

TABLE 1-continued
SCHEDULE
UNLOADING AND RELOADING CALANDRIA

Schedule starting condition: Core 47 is in position shown in FIG. 7; the Spaces A to I are loaded with particles that were dehydrated in the previous cycle. These spaces must now be emptied and cleaned. As the core is raised, the lower tip of Shaft 24 stops at Stations i, h, g, f, e, d, c, b, and a. The spaces are emptied and cleaned at each stop, as described in detail below:

| Elapsed minutes | Station (Shaft 24 position) | Action: Normal atmospheric pressure returned. Oil flow stopped. Ram 27 raises core to Station i. Rams 49 raise lid 18. |
|---|---|---|
| 0.2 | h | Shaft/in Station h. Motor 55 spins out contents of Space H; tool 62 cleans Space H. 24 |
| 0.3 | g | Shaft/in Station g. Motor 55 spins out contents of Space G; tool 62 cleans Space G |
| 0.4 | f | Space F emptied and cleaned as above. |
| 0.5 | e | Space E emptied and cleaned as above. |
| 0.6 | d | Space D emptied and cleaned as above. |
| 0.7 | c | Space C emptied and cleaned as above. |
| 0.8 | b | Space B emptied and cleaned as above. |
| 0.9 | a | Space A emptied and cleaned as above. Core position as in FIG. 4. Filling with wet particles (FIG. 4) |
| 1.0 | b | Core lowered one step so that Space A coincides with filler 65. Ram 66 pushes filler through opening 71 in screen 68. Deflector 63 is lowered to turn moving particles on feed conveyor belt 64 so that the particles fall on feeder 65. Oil from nozzle 67 washes particles into Space A. Motor 55 rotates clockwise at about 20 RPM, causing wet particles to impinge on back side of feeder 65 and to accumulate and fill Space A as shown in FIG. 6. Feeder 65 is now withdrawn, permitting the core to be lowered. |
| 2.0 | c | Core is lowered to Station c. Filler 65 is inserted. Space B is filled. Filler withdrawn. |
| 3.0 | d | Core is lowered to Station d. Filler is inserted: Space C is filled. Filler withdrawn. |
| 4.0 | e | Core is lowered to Station e. Filler is inserted. Space D is filled. Filler withdrawn. |
| 5.0 | f | Core is lowered to station f. Filler is inserted. Space E is filled. Filler withdrawn. |
| 6.0 | g | Core is lowered to Station g. Filler is inserted. Space F is filled. Filler withdrawn. |
| 7.0 | h | Core is lowered to Station h. Filler is inserted. Space G is filled. Filler withdrawn. |
| 8.0 | i | Core is lowered to Station i. Filler is inserted. Space H is filled. Filler withdrawn. |
| 9.0 | j | Core is lowered to station j. Filler is inserted. Space I is filled. Filler withdrawn. |

Performing the Dehydration

When the calandria has been cleared of the previous load that has been dehydrated and a new wet load now fills all Spaces A to I, dehydration proceeds in the following manner. Core 47 is lowered to Station 1, rams 49—49 lower lid 18 which closes the calandria by making a vacuum-tight seal at 19—19 as in FIG. 7. Manifold 21 makes a flexible seal 20 with valve housing 37. Valve flapper 109 opens, valve 40 opens and connection is made with Stage I vacuum system, FIG. 1. Valve 34 opens and heated oil at temperature $t_1$ flows into manifold 31, through nozzle 35, passes valve 36, which is open, enters hollow shaft 24 via port 30, discharges through holes 26 in spacers 25 to fill Spaces A to I, contacts and heats particles in Spaces A to I and is partially cooled thereby to temperature $t_2$, exits Spaces A to I via holes 29 together with water vapor, and separates from the water vapor by falling into cone 14 while the water vapor that has evolved rises to enter the vacuum evactor Stage I via valves 37 and 40. The oil fills cone 14 until the float 42 rises enough to work the oil level regulating system, raising float link bar 75, partially closing valve 36 and partially opening valve 41 thereby maintaining an appropriate oil height at approximately level d. Oil flows out of cone 14 when valve 41 is open, passes outlet pipe 44, enters pump 45 and is discharged at slightly above atmospheric pressure through discharge pipe 46, manifold 57, valve 60 which is open, and enters tank 91. To prevent cavitation in the partial vacuum condition that prevails in pump 45, this pump is arranged to stop when valve 41 is closed, and to start when valve 41 is open. This is Stage I dehydration action, and as it proceeds, a point is reached where the rate of water vapor evolution slows down, and further dehydration can be accomplished only by improving the vacuum and raising the temperature of the oil. At this point, we terminate Stage I and advance into Stage II, as in Table 2.

Stage II is effected in the calandria by closing valve 40 and opening valve 39, and at the same time bringing in oil that is at a slightly higher temperature. Oil from tank 90, which is at the highest permissible temperature is mixed with incoming oil from tank 91 by partially opening both valves 33 and 34 to achieve a desired higher temperature of the oil flowing into the calandria. After dehydration in Stage II, this rate will again slow down, and a shift to still higher vacuum and higher oil temperature may be made by going into Stage III with the calandria in question.

Stage III is effected by closing valve 39 and opening valve 38, and sumultaneously bringing in oil from tank 90, fully opening valve 33 and closing valve 34. Thereby the oil is raised to about 90° C., or the highest permissible that does not thermally deteriorate the particles, and the vacuum is improved to about 4 Torr, or the lowest absolute pressure, afforded by Stage III vacuum system. Temperature and pressure readings are recorded at regular intervals during all stages in order to obtain data for calculations on the progress being made. When the desired degree of dehydration has been achieved, the hot oil is drained by closing valve 33 and raising the core to Station k. This action brings trays 23 up to the same level as hole 29 in screen 28, and the hot oil drains out of holes 29. Oil that remains in shaft 24 drains out at the bottom of shaft 24, which is now elevated to be clear of seal 30. When the hot oil has all drained out, the core is lowered to level l, and the spaces are filled with oil at about 35° C. from tank 89 by opening valve 32. Chilled oil is circulated through the calandria spaces until the particles are hardened by cooling. Then the cold oil is drained by again raising the core to Station k. Now the particles are subjected to centrifugal action of motor 55 which rotates the core at about 100–200 RPM and throws off excess oil clinging on the particle surfaces. After centrifuging, the hardened and cooled particles, which have been dehydrated and puffed and relieved of excess oil, are restored to normal atmospheric pressure, and the cycle is complete; they may now be discharged.

A constant supply of cold oil can be maintained in tank 89 without the use of a conventional heat exchanger by utilizing the cooling capacity of the new load of wet particles. Thus the calandria containing a new wet load may be evacuated initially by opening valve 38 and drawing the absolute pressure down to a low measurement, say in the range 5–10 torr. If now valve 32 is opened, oil from tank 89 may be circulated between the wet particles, which will have been reduced in temperature by evaporation of some of their moisture, and the oil will be cooled thereby to the range well below 20°–30° C. and will be returned to tank 89. This oil may be purified of droplets of juice by settling or centrifuging in the purifier 131. After sufficient cold oil has been obtained in this way, dehydration of the wet charge may commence by closing valve 38 and opening valve 40, connecting the calandria to Stage I and circulating through the wet load, oil from tank 91. The operation of preparing a quantity of cold oil may be used at the commencement of dehydration of every charge if desired. It is clear that this operation partially dehydrates the wet load, and conserves heat by using heat in the cooling oil for the purpose of partial dehydration.

The end point of the dehydration is reached when the residual moisture content of the particles has been reduced to a predetermined percentage of the weight of the load, for example 2%. This point can be calculated by the following formula if the course of dehydration has been exactly followed; $H_4$ is weight of the residual moisture in the load being dehydrated.

Formula 143
$$H_o = L - S = H_4 + \sum_0^{30} H_1 + \sum_{30}^{60} H_2 + \sum_{60}^{90} H_3 \text{ pounds of water}$$

The limits 30, 60 and 90 minutes are read from FIG. 11. Here the summations are conveniently made second by second from Formula 141 by the programmed computer, and $H_4$ obtained by subtraction. The ordinate headings in FIG. 11 are pounds of water vapor evaporated from 100 pounds of wet load, that contained 80% of water. Another way to obtain the end-point of dehydration is empirically; by first determining the temperature drop by sensible cooling that the hot oil undergoes when circulating through the unloaded calandria, and then comparing this with the drop in oil temperature that results from residual evaporation in the nearly finished load. When this further drop in oil temperature reaches a predetermined value, the desired degree of dehydration has been reached. Thus, if the hot oil loses one degree of temperature when circulating through the empty calandria, and x additional degrees of temperature loss is the indicator of sufficient dryness of the load, then the dehydration may be safely terminated when $t_1 - t_2 = 1 + x$, and the vacuum of Stage III has reached a predetermined low measure. This simple method is best adopted after experience has been gained with fruit particles cut to a constant thickness, and after variables of the dehydration operation have been reduced to constants by having established a standardized proceedure.

Coordination of a Multiple System

Figure 3:
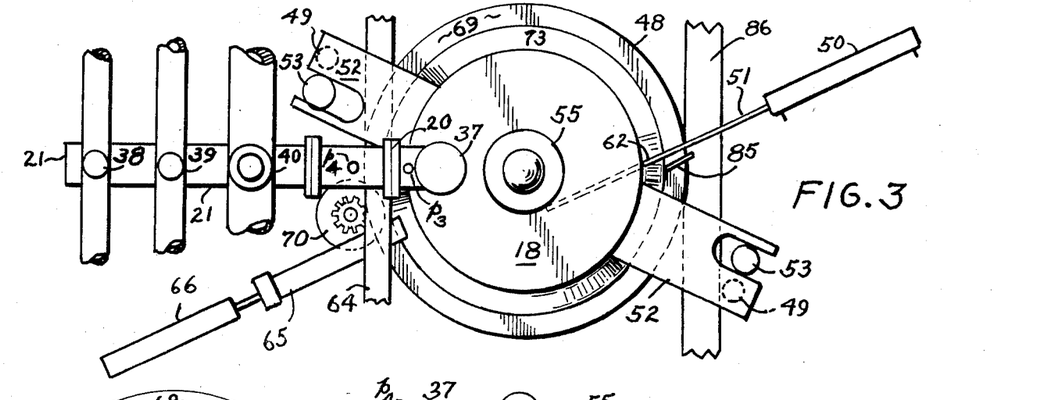
FIG. 3 is a plan view of one calandria unit with connecting pipes for oil inlet and outlet and water vapor outlet, and conveyors for bringing wet particles to the calandria and for removing dried particles therefrom.

The foregoing description has been drawn to apply to operations with a single calandria that undergoes dehydration of a load of wet particles through the three vacuum stages. For larger rates of production in a large commercial plant, it will be advantageous to utilize two or more calandrias that are coordinated to operate together in a multiple system. This advantage is especially strong when it is noted that fruit particles normally undergo the most rapid rate of evaporation at the start, called the "constant-rate period", or Stage I in our notation. In our U.S. Pat. No. 4,006,260, we cite the example in FIG. 3 of this patent, of a 100 kg. load that evolves moisture at the rate of 3.8 kg/min during the constant rate period of Stage I, and this rate declines to 1.5 kg/min in Stage II, and declines still further to less than 0.125 kg/min in Stage III. To ensure continuation of these rates of drying the vacuum is improved in each stage, and the temperature is increased. Thus Stage I starts at 90 torr and 57° C.; and ends at 68 torr and 66° C.; Stage II starts at the latter conditions and ends at 18 torr and 78° C.; Stage III starts at the latter conditions and ends at about 4 torr and 99° C. The present invention operates over a wide range that includes these conditions of vacuum and temperature. I prefer to provide a separate vacuum system for each stage, wherein each evactor is operating within its limited range of highest efficiency, as illustrated in FIG. 1. These separate systems are coordinated in a step-wise manner to operate in a multiple system that includes several calandrias whose phases of operation may be sequenced in a manner of which the schedule of Table 2 is an example.

TABLE 2

DEHYDRATION SCHEDULE

| Ca-lan-dria | 30 min. | 60 min. | 90 min. | 120 min. | 150 min. | 180 min. | 210 min. | 220 min. |
|---|---|---|---|---|---|---|---|---|
| #1 load | Stage I | II | III | unload reload | I | II | III | unload re-load |
| #2 | load | Stage I | II | III | unload re-load | I | II | III |
| #3 | | load | Stage I | II | III | unload re-load | I | II |
| #4 | | | load | Stage I | II | III | unload re-load | I |

Table 2 shows that use of the calandrias is staggered in time. For example Calandria #1 is loaded at zero minutes, it passes through Stage I at 30 minutes, Stage II at 60 minutes, Stage III at 90 minutes, and unloading and reloading at 120 minutes. Operation goes on past 220 minutes until some arbitrarily determined time limit, and then it is stopped in the same staggered manner.

It is vital to maintain an adequate supply of cool oil at about 35° C. or lower in tank 89. This insures cooling and hardening the structure of the puffed fruit particles after dehydration and before they are centrifuged to remove oil from their surfaces. To assure this supply of cool oil in the multiple system, the vacuum in a calandria that has completed its cycle, is broken by connecting it with the calandria that has been newly loaded. This instantly evacuates the new load to about 30 torr; then the calandria with the new load is connected to be evacuated further by Stage I evactor, and simultaneously, oil valves 32 and 58 are opened allowing oil from tank 89 to circulate through the cold wet load and be returned in the cooled condition via pump 45 and valve 58, to then enter tank 89.

A further advantage of the present invention results from the convenient method of nearly automatic loading, cleaning and reloading of trays that I provide, whereby making it possible to include many shallow trays in a single calandria, without the necessity of employing labor to service the large number of trays. Shallow tray spaces, where the oil cannot reach depths of more than 70 to about 100 millimeters or thereabouts, insures that all particles of fruit, even those residing at the bottom of the tray space shall be actively dehydrated under vacuum condition sufficient to assure dehydration at temperatures of the oil not above the caramelization temperature.

What I claim is:

1. A system for dehydrating food particles comprising in combination:
    a pressure vessel having an elongated vertically cylindrical chamber, particle inlet means for introducing particles into said chamber, and particle outlet means for removing particles from said chamber;
    an elongated vertically oriented shaft rotatably mounted coaxially within said chamber, said shaft is vertically moveable;
    a plurality of circular trays mounted in vertical spaced relation on said shaft for rotation therewith and for containing food particles;
    means for selectively introducing a heat transfer liquid into said vessel for selectively heating and cooling food particles in said chamber;
    means for evacuating said vessel and thereby establishing a pressure in said vessel below atmospheric pressure for enhancing the dehydration of food particles contained therein;
    means defining a loading and an unloading zone adjacent the top of said vessel;
    means for moving said trays along the axis of said shaft through said loading and unloading zones in a first direction for loading food particles onto said trays and in a second direction for unloading food particles from said trays;
    cylindrical screen means surrounding said trays and mounted for rotation therewith and axially fixed within said vessel for confining food particles on said trays within a selected zone within said vessel; and
    said system further comprises means for selectively moving said shaft for moving said trays through said respective zones.

2. A system according to claim 1 wherein:
    said shaft is tubular and includes port means for communicating said heat transfer liquid to the upper surface of each of said trays.

3. A system according to claim 1 wherein said:
    cylindrical screen means includes impervious wall means for confining heat transfer liquid to a predetermined level within each of said trays.

4. A system for dehydrating food particles comprising in combination:
    a pressure vessel having an elongated vertically cylindrical chamber, particle inlet means for introducing particles into said chamber, and particle outlet means for removing particles from said chamber;
    an elongated vertically oriented shaft rotatably mounted coaxially within said chamber;
    a plurality of circular trays mounted in vertical spaced relation on said shaft for rotation therewith and for containing food particles;
    means for selectively introducing a heat transfer liquid into said vessel for selectively heating and cooling food particles in said chamber;
    means for evacuating said vessel and thereby establishing a pressure in said vessel below atmospheric pressure for enhancing the dehydration of food particles contained therein;
    means defining a loading and an unloading zone adjacent the top of said vessel;
    means for moving said trays along the axis of said shaft through said loading and unloading zones in a first direction for loading food particles onto said trays and in a second direction for unloading food particles from said trays;

cylindrical screen means surrounding said trays and mounted for rotation therewith and axially fixed within said vessel for confining food particles on said trays within a selected zone within said vessel; and said vessel includes closure means at the top thereof, said closure means being vertically moveable with said shaft providing access to the interior of said chamber for loading and unloading said trays.

5. A system according to claim 4 comprising:

means including an axially fixed rotatable screen defining centrifuge means at said loading zone.

6. A system according to claim 5 comprising:

unloading means at said unloading zone for selectively unloading said trays at said unloading zone as each of said trays is moved through said unloading zone; and loading means at said loading zone for loading each of said trays as said trays are moved through said loading zone.

7. A system according to claim 6 wherein:

said unloading means comprises centrifugal means for discharging particles from a tray in said unloading zone; and conveyer means for receiving said particles.

8. A system according to claim 7 comprising:

a plurality of said pressure vessels interconnected by means of a fluid circuit for selectively directing fluid to a selected one of the chambers, and by means of a conveyer circuit for selectively loading and unloading a selected one of said chambers.

9. A dehydrating system for removing moisture from edible particles, comprising:

a pressure vessel defining a vertically oriented cylindrical pressure chamber, said vessel having a removable top defining closure means for providing access to said chamber;

an elongated drive shaft coaxially mounted within said chamber;

a plurality of vertically spaced circular trays mounted on said shaft for rotation therewith;

axially fixed rotatable wall means surrounding said trays for defining wall means therefor and including port means for defining a liquid level within each of said trays;

means for moving said trays axially along said chamber relative to said wall means for providing access thereto for loading and unloading said trays;

fluid means for introducing a heat transfer fluid into said trays for transferring heat to and from particles on said trays; and vacuum means for evacuating said chamber and establishing a selected pressure in said chamber.

10. A system according to claim 9 comprising:

means defining a loading station and loading means at the top of said vessel for loading particles onto said trays; and means defining an unloading station including loading means adjacent said loading station for unloading particles from said trays.

11. A system according to claim 10 comprising:

a plurality of said vessels disposed in an array;

a fluid system interconnecting said vessels for selectively directing fluid to and from said vessels;

heating means for heating said fluid to a selected pre-determined temperature;

cooling means for selectively cooling said fluid;

loading means including conveyer means for loading particles into said chamber; and unloading means including conveyer means for selectively unloading said chambers.

* * * * *